Jan. 30, 1923.

G. A. YEATON.
GUIDE PULLEY.
FILED JAN. 3, 1922.

1,443,605.

INVENTOR
GEORGE A. YEATON
BY C. F. Blake
ATTY.

Patented Jan. 30, 1923.

1,443,605

UNITED STATES PATENT OFFICE.

GEORGE A. YEATON, OF PORTLAND, OREGON.

GUIDE PULLEY.

Application filed January 3, 1922. Serial No. 526,704.

*To all whom it may concern:*

Be it known that I, GEORGE A. YEATON, a citizen of the United States, residing at Portland, county of Multnomah, State of Oregon, have invented certain new and useful Improvements in Guide Pulleys, of which the following is a specification.

My invention relates to guide pulleys in general, and particularly to such pulleys as are used to guide the quarter turned belts upon planing machines, and the like, the object being to provide a device that will guide the belt even though the device may be placed at the point where the quarter turned belt will not lie flat upon the guide pulley, a device from which the belt will not become dislodged, and a device wherefrom a belt may be removed or whereupon it may be placed easily and quickly.

Figure 1:
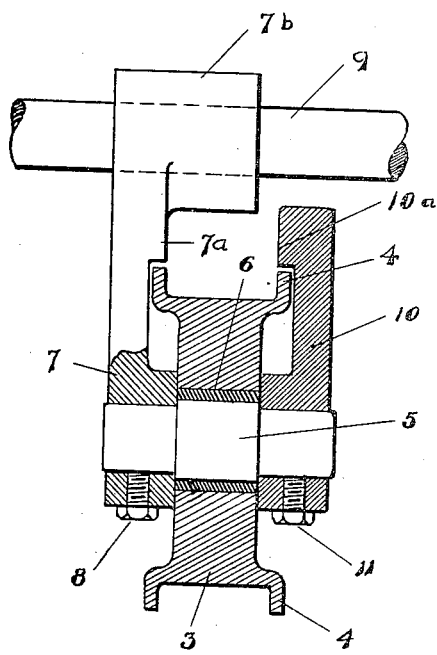
Figure 2:
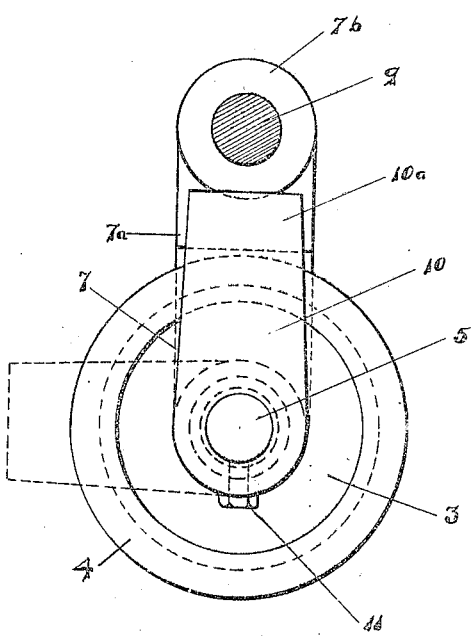

I accomplish the above object by means of the construction illustrated in the accompanying drawing, which is a part of this application for Letters Patent, like characters of reference indicating like parts throughout the several views thereof, and in which:

Fig. 1 is a sectional elevation of my device, and Fig. 2 is a side elevation of the same.

The guide pulley 3 is provided with suitably deep flanges 4, and is mounted upon a shaft 5 with a bushing 6. The shaft 6 is mounted in a hanger 7 and is held rigidly therein by means of a setscrew 8. Said hanger is mounted upon a shaft 9, which shaft is journaled upon the frame of the planer or other convenient member adjacent the pulley 3. The arm of the hanger 7 is offset as shown at 7ª so that the inside surface thereof is in line with the inside surface of the adjacent pulley flange 4.

Upon the opposite end of the shaft 5 from that upon which is mounted the hanger 7 there is secured an arm 10 by means of a setscrew 11.

Said arm 10 is offset at its end as shown at 10ª, so that the inside surface of said arm is in line with the inside surface of the adjacent pulley flange 4.

The result of this construction is that the belt is housed in by the pulley, pulley flanges, hanger and arm, beyond any possibility of its flying off of the pulley. Should it be required to replace the belt it may be accomplished by simply loosening the setscrew 11 and swinging the arm 10 to the position shown in dotted lines in Fig. 2, whereupon the belt may be removed or placed in position through the opening between the pulley flange 4 and the hanger hub 7ᵇ.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a belt guide: an offset hanger suspended from a shaft; a shaft secured in the extremity of said hanger; a pulley rotatably mounted on said latter shaft; and an offset arm mounted upon said latter shaft with the free end thereof terminating adjacent the hub of said hanger and movable relatively to said hub.

2. In a belt guide: an offset hanger and an offset arm mounted upon opposite ends of a shaft with the termination of said arm adjustably adjacent the hub of said hanger, and a pulley rotatably mounted upon said shaft.

3. In a belt guide: a flanged pulley; a shaft upon which said pulley is rotatably mounted; an offset hanger having a hub at one extremity thereof and a mounting for said shaft at the opposite extremity; an offset arm secured upon one end of said shaft and terminating adjacent said hub; and a shaft upon which said hub is mounted.

4. In a belt guide: an offset hanger; a shaft mounted therein; a flanged pulley rotatably mounted upon said shaft; and an offset arm secured to said shaft and adapted to be rotated for the purpose of allowing a belt to be placed upon or removed from said pulley.

In witness whereof I claim the foregoing as my own I hereunto affix my signature in the presence of two witnesses at Portland, county of Multnomah, State of Oregon, this 15th day of Nov., 1921.

GEORGE A. YEATON.

Witnesses:
C. F. BLAKE,
L. J. ROBINSON.